Feb. 4, 1930.
C. C. BRADBURY
1,745,841
RECTIFIER CIRCUIT
Filed April 11, 1927
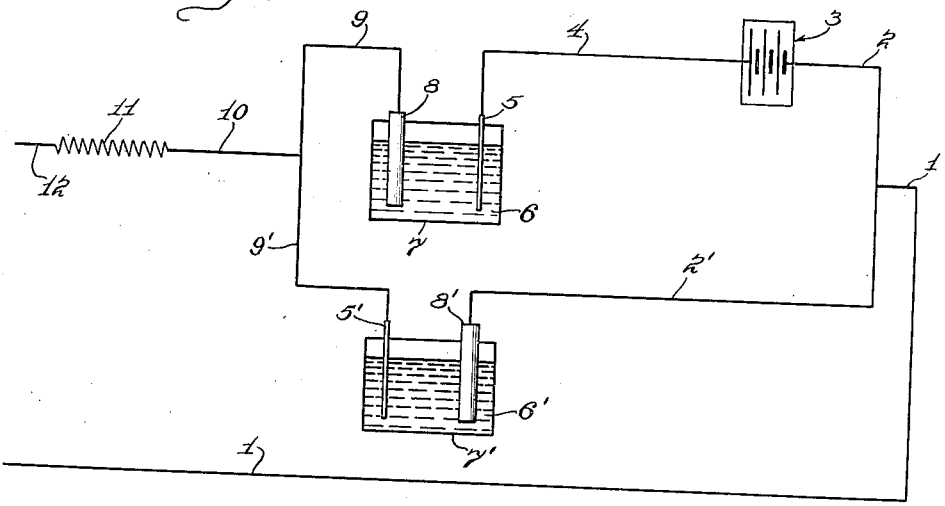
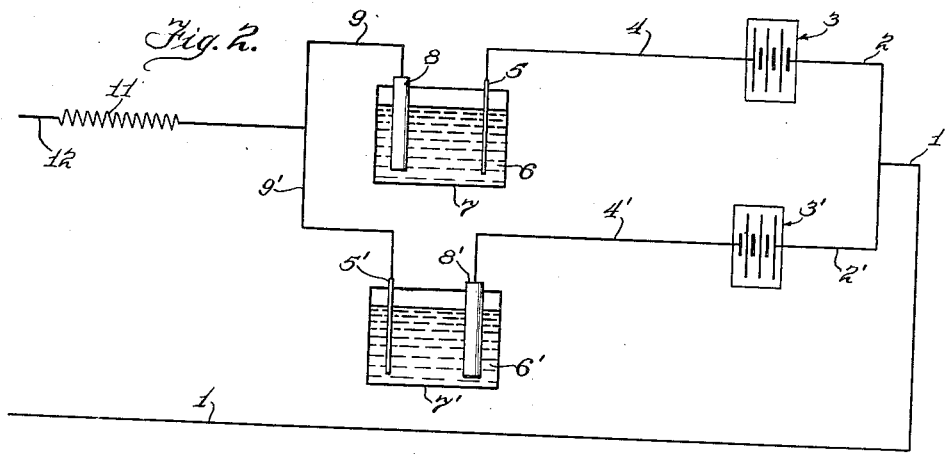
Inventor.
Clifford C. Bradbury
By Williams Bradbury
McCaleb & Hinkle
Attorneys.

Patented Feb. 4, 1930

1,745,841

UNITED STATES PATENT OFFICE

CLIFFORD C. BRADBURY, OF GLENCOE, ILLINOIS, ASSIGNOR TO FANSTEEL PRODUCTS COMPANY, INC., OF NORTH CHICAGO, ILLINOIS, A CORPORATION OF NEW YORK

RECTIFIER CIRCUIT

Application filed April 11, 1927. Serial No. 182,762.

This invention relates to the use of electrolytic rectifiers directly from alternating current potentials above those usually employed. Electrolytic rectifiers, especially of the tantalum sulphuric-acid type, can be efficiently operated only at certain voltages. If a tantalum sulphuric-acid rectifier is used directly across a 110-volt circuit, the film on the tantalum electrode breaks down and the rectifying action of the cell is impaired. If a resistance is placed in series with this cell, the voltage will be reduced while the current is flowing, but when the cell acts as a valve, the full 110 volts builds up, which causes the film to break down. Consequently, it has been deemed necessary to use a transformer with rectifiers of this type so that the back voltage may be maintained within proper limits.

The object of this invention is to do away with the necessity of a transformer for this purpose and to provide a means for operating the cell directly from the high voltage circuit.

Other objects will be apparent as the description of the invention proceeds.

In the accompanying drawings which show preferred embodiments of my invention,

Fig. 1 represents diagrammatically a wiring diagram wherein a single battery is being charged, and Fig. 2 represents a modification for charging two storage batteries.

A conductor 1 from one side of an alternating current source is connected by conductor 2 to negative terminal of storage cells 3. The positive terminal of the cells is connected by conductor 4 to a tantalum electrode 5 immersed in an electrolyte 6, preferably of dilute sulphuric acid (specific gravity 1.200), to which a small amount of a salt of a metal of the iron group has been added.

The electrolyte is contained in a receptacle 7 which may be of glass, hard rubber, or other suitable acid-proof material. A lead electrode 8 is also immersed in the electrolyte and is connected by conductors 9 and 10 to one terminal of a resistance 11, the other terminal of which is connected by conductor 12 to the other side of the alternating current source.

A conductor 2' connects conductor 1 with the lead electrode 8' of a second electrolytic cell, including an electrolyte 6', a receptacle 7', and a tantalum electrode 5' which is connected by conductor 9' to conductor 10, as shown in Fig. 1.

Fig. 2 is exactly the same as Fig. 1 with the exception that the positive terminal of a storage battery 3' is connected to conductor 2' and the negative terminal of battery 3' is connected to the lead electrode 8' by conductor 4'.

The operation of my invention may be described as follows:

When the current is flowing clockwise in the circuits, current will flow through tantalum electrode 5 and will be effectively stopped by the tantalum electrode 5', thus permitting a charging current to flow through battery 3. When the current reverses, the tantalum electrode 5 acts as a closed valve and tantalum electrode 5' permits the current to flow. Thus there is current flowing at all times in the circuit so that the resistance 11 is always effective to maintain a proper voltage imposed upon the tantalum film.

The example shown in Fig. 2 utilizes the second electrolytic cell to charge a second storage battery.

While I have described in detail specific examples of my invention, it is understood that I am not limited thereby except as defined by the following claims.

I claim:

1. Means for operating a tantalum-sulphuric acid electrolytic rectifier directly from alternating current at high voltages which comprises a resistance in series with said rectifier and a similar rectifier shunted around said first rectifier to permit current to flow in the reverse direction whereby the resistance will be effective to limit the back voltage on the tantalum electrode during both half waves of the alternating current cycle.

2. An electrolytic rectifier, a resistance unit and a storage battery in series with said rectifier, and a similar rectifier bridging said first rectifier and storage battery and connected oppositely to said first rectifier.

3. The method of regulating alternating voltage across a rectifier connected in series with a resistance which comprises providing a shunt rectifier and connecting it in reversed direction from said first named rectifier whereby current may flow to render the resistance effective during both half waves of the cycle.

In witness whereof, I hereunto subscribe my name this 7th day of April, 1927.

CLIFFORD C. BRADBURY.